United States Patent
Hall et al.

(10) Patent No.: US 11,400,730 B2
(45) Date of Patent: Aug. 2, 2022

(54) SYSTEMS AND METHODS FOR PREDICTING PRINTING DEVICE FAILURES OR MAINTENANCE NEEDS

(71) Applicant: Global Graphics Software Limited, Cambridge (GB)

(72) Inventors: Daniel Hall, Cambridge (GB); James Fox, Herts (GB)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 340 days.

(21) Appl. No.: 16/678,730

(22) Filed: Nov. 8, 2019

(65) Prior Publication Data

US 2021/0138797 A1    May 13, 2021

(51) Int. Cl.
| | |
|---|---|
| *B41J 2/21* | (2006.01) |
| *B41J 3/54* | (2006.01) |
| *B41J 2/165* | (2006.01) |
| *B41J 2/195* | (2006.01) |
| *G05B 23/02* | (2006.01) |

(52) U.S. Cl.
CPC ......... *B41J 2/2142* (2013.01); *B41J 2/16579* (2013.01); *B41J 2/195* (2013.01); *B41J 3/543* (2013.01); *G05B 23/0283* (2013.01)

(58) Field of Classification Search
CPC ...... B41J 2/2142; B41J 2/16579; B41J 2/195; B41J 3/543; G05B 23/0283
See application file for complete search history.

(56) References Cited

U.S. PATENT DOCUMENTS

| | | | | |
|---|---|---|---|---|
| 8,002,383 B2 * | 8/2011 | Kachi | ................. | B41J 2/16585 |
| | | | | 347/33 |
| 2012/0139982 A1 * | 6/2012 | Abe | .................... | B41J 2/04561 |
| | | | | 347/14 |
| 2018/0373233 A1 * | 12/2018 | Goto | ................. | G05B 23/0229 |

FOREIGN PATENT DOCUMENTS

| | | | | | |
|---|---|---|---|---|---|
| JP | 2006088391 A | * | 4/2006 | ........... | H04N 9/3194 |
| JP | 2013073440 A | * | 4/2013 | .......... | B41J 13/0009 |
| JP | 2017047613 A | * | 3/2017 | ......... | H04N 1/00039 |
| JP | 6282057 B2 | * | 2/2018 | ........... | H04N 1/6036 |
| WO | WO-2018079023 A1 | * | 5/2018 | ........... | H04N 9/3194 |

* cited by examiner

*Primary Examiner* — Sharon Polk
(74) *Attorney, Agent, or Firm* — Branch Partners PLLC; Bruce E. Black

(57) ABSTRACT

A system for monitoring an inkjet printing device and predicting failures or maintenance needs. The system includes one or more memory devices; a print analysis engine stored in the one or more memory devices to monitor the print output from the inkjet printing device, operation of the inkjet printing device, or any combination thereof; and one or more processor devices to perform actions, including: monitoring print output from the inkjet printing device, operation of the inkjet printing device, or any combination thereof; based on the monitoring, predicting a failure or maintenance need of the inkjet printing device; based on the prediction, suggesting or performing maintenance on the inkjet printing device to address the predicted failure or maintenance need; and, after maintenance has been performed, monitoring the print output, operation of the printing device, or any combination thereof to determine whether the predicted failure or maintenance need has been resolved.

20 Claims, 2 Drawing Sheets

SYSTEMS AND METHODS FOR PREDICTING PRINTING DEVICE FAILURES OR MAINTENANCE NEEDS

FIELD

The invention relates to systems and method for predicting printing device failures or maintenance needs and adjusting the printing device to address the predicted failures or maintenance needs. The invention also relates to systems and methods for monitoring print output or printing device operation to predict printing device failures or maintenance needs.

BACKGROUND

Printers and printing presses require regular maintenance. As an example, for inkjet printing, inkjet heads and nozzles can and will fail. Typically, users and systems are reactive to reduction in print quality or actual failure of components of the printer or printing press. This reactive approach can lead to sub-standard printing and unplanned printer or printing press downtime.

BRIEF SUMMARY

One embodiment is a system for monitoring an inkjet printing device and predicting failures or maintenance needs. The system includes one or more memory devices that store instructions; a print analysis engine stored in the one or more memory devices, the print analysis engine configured to monitor the print output from the inkjet printing device, operation of the inkjet printing device, or any combination thereof to predict failures or maintenance needs of the inkjet printing device; and one or more processor devices that execute the stored instructions to perform actions, including: monitoring print output from the inkjet printing device, operation of the inkjet printing device, or any combination thereof; based on the monitoring, predicting a failure or maintenance need of the inkjet printing device; based on the prediction, suggesting or performing maintenance on the inkjet printing device to address the predicted failure or maintenance need; and, after maintenance has been performed, monitoring the print output, operation of the printing device, or any combination thereof to determine whether the predicted failure or maintenance need has been resolved.

In at least some embodiments, the monitoring includes receiving measurements of the print output or the operation of the inkjet printing device from a measurement device. In at least some embodiments, the monitoring further includes analyzing the measurements.

In at least some embodiments, the predicting includes determining whether the print output or operation of the inkjet printing device has met or exceeded a threshold selected to predict that the failure or maintenance need is likely to occur. In at least some embodiments, the threshold is directed to a variation in tonality or color for an ink or color. In at least some embodiments, the threshold is directed to a presence or number of inappropriate white lines in the print output. In at least some embodiments, the threshold is directed to a number of blocked nozzles.

In at least some embodiments, the instructions further include, based on the prediction, adjusting printing parameters or printing device operation to compensate for the predicted failure or maintenance need.

In at least some embodiments, the system further includes the inkjet printing device. In at least some embodiments, the one or more memory devices and the one or more processor devices are part of the inkjet printing device. In at least some embodiments, the system further includes a computing device configured and arranged for communication with the inkjet printing device, wherein the one or more memory devices and the one or more processor devices are part of the computing device.

In at least some embodiments, the system further includes one or more measurement devices configured to generate the measurements. In at least some embodiments, the system further includes the inkjet printing device, wherein at least one of the one or more measurement devices is part of the inkjet printing device. In at least some embodiments, the one or more measurement devices includes at least one first measurement device configured to produce measurements of the print output of the inkjet printing device.

Another embodiment is a method for monitoring an inkjet printing device and predicting failures or maintenance needs. The method includes monitoring print output from the inkjet printing device, operation of the inkjet printing device, or any combination thereof; based on the monitoring, predicting a failure or maintenance need of the inkjet printing device; based on the prediction, suggesting or performing maintenance on the inkjet printing device to address the predicted failure or maintenance need; and after maintenance has been performed, monitoring the print output, operation of the printing device, or any combination thereof to determine whether the predicted failure or maintenance need has been resolved.

In at least some embodiments, the monitoring includes receiving measurements of the print output or the operation of the inkjet printing device from a measurement device. In at least some embodiments, the monitoring further includes analyzing the measurements.

In at least some embodiments, the predicting includes determining whether the print output or operation of the inkjet printing device has met or exceeded a threshold selected to predict that the failure or maintenance need is likely to occur. In at least some embodiments, the method further includes, based on the prediction, adjusting printing parameters or printing device operation to compensate for the predicted failure or maintenance need.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
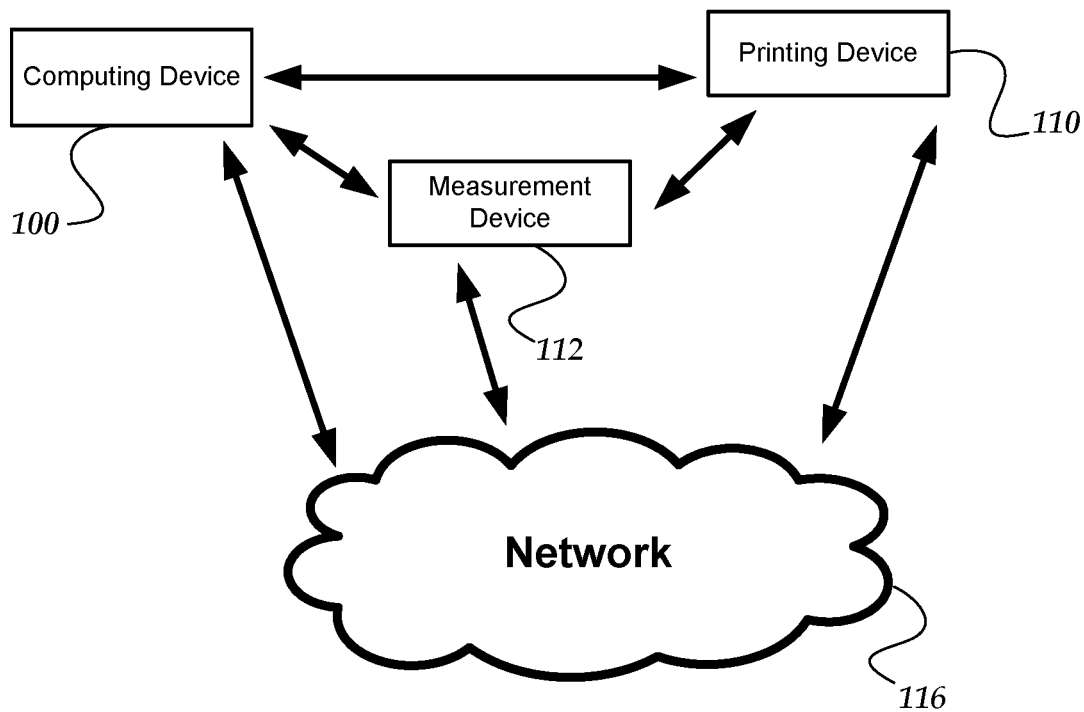
FIG. 1A is a schematic representation of one embodiment of an environment in which the invention can be employed.

The invention relates to systems and method for predicting printing device failures or maintenance needs and adjusting the printing device to address the predicted failures or maintenance needs. The invention also relates to systems and methods for monitoring print output or printing device operation to predict printing device failures or maintenance needs.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment, or an embodiment combining software and hardware aspects. The following detailed description is, therefore, not to be taken in a limiting sense. The methods described herein can be performed using any type of processor and any suitable type of device that includes a processor.

Inkjet technology is increasingly used for high-speed production printing, but inkjet heads can fail in a wide variety of ways. Failures can include, but are not limited to, nozzle wear (for example, wear to the nozzle orifice or surrounding coating which may lead to, for example, misdirection of ink drops, lightening or darkening of prints, or the like); nozzle blockage (for example, when the nozzles are left open without capping or spitting for too long); nozzle wetting (for example, ink accumulation on the faceplate of the printhead which can interfere with jetting); and ink drying or curing on the faceplate of the printhead (which may be initially triggered, for example, by wetting and then exacerbated by insufficient shielding of UV curing lights). Any head failures can reduce the quality of the printed output. Effects of inkjet head failure can include, but are not limited to, white lines along the print (particularly on a single-pass press); uneven tonality or color across the press; tonality or color varying with time; lightening or darkening of print; and failure to print at all. Actions to rectify these issues can range, for example, from PrintFlat™ or other recalibration, drive voltage adjustment, waveform adjustment, head cleaning to replacement of individual heads, or even of entire print bars or any combination thereof. Inkjet head failure can result in printing failures which may be costly or time-consuming (due to reprinting of poorly printed projects.)

To preempt inkjet head failure, as described herein, systems and methods can utilize in-line, near-line, or offline measurement and review of the printed output to predict future failures or maintenance needs. This measurement and review can be used to make adjustments to printing parameters, instructions, or data or to perform or suggest maintenance prior to printing device failure. For example, the systems and methods can provide adjustments to the data sent to the heads to compensate for issues such as uneven tonality, white lines, and the like. The prediction of failures or maintenance needs is not scheduled maintenance, but rather the preemptive identification or prediction of possible future failures or maintenance needs by observing printing device performance, operation, or any combination thereof.

In at least some embodiments, the systems and methods can accumulate data regarding the printed output (such as printed tonality) over time; analyze the data to predict failures or maintenance needs by, for example, identifying trends or identifying when the printed output crosses pre-specified thresholds; and make adjustments or perform or suggest maintenance or replacement of printer components. In at least some embodiments, the systems and methods are used to predict failures or maintenance needs and to make adjustments or perform/suggest maintenance in advance of predicted failure or maintenance need. In at least some embodiments, the systems and methods are used to predict potential failures or maintenance needs before there is a visible effect in the print output and then make adjustments or perform/suggestion maintenance prior to any visible effect in the print output. In at least some embodiments, the system and methods can take, or suggest that an operator take, corrective measures before the inkjet head (or other) failures or maintenance needs become noticeable in the printed output or noticeable to the operator or customer or reduce image quality to an unacceptable or unsaleable level. These systems and methods can reduce downtime, printing output loss, or other deleterious effects of inkjet head (or other) failures.

FIG. 1A illustrates one embodiment of an environment for the systems and methods described herein. The environment includes a printing device 110, a computing device 100, and a measurement device 112. It will be understood that two or more of these devices may be combined in a single physical device. For example, the computing device 100 and printing device 110 may be a printer and associated computer hardware/software and, in some embodiments, may also include the measurement device 112. It will also be understood that any of the devices may be actually multiple devices, such as multiple computing devices 100 or multiple measurement devices.

In at least some embodiments, the environment also includes a network 216 that can be a local area network, a wide area network, the Internet, or any combination thereof. It will also be understood that the network can include devices, other than those illustrated, coupled to the network and that there may be multiple devices of each type illustrated connected to the network. The computing device 100, printing device 110, and measurement device 112 can be directly coupled to each other can be coupled through the network 216 or through one or more other devices (e.g., computers, workstations, servers, or the like).

The computing device 100 can be a computer, tablet, workstation, server, mobile device, or any other suitable device that can process instructions. The printing device 110 can be a printing press, printer, or the like.

The measurement device 112 can be an optical scanner, camera system, spectrophotometric system, quality control system, photodiode, photodiode array, or any other suitable device or system that can perform measurements or quality control. In at least some embodiments, the measurement device may include a controlled light source such as an incandescent light, fluorescent light, LED array, laser, or the like or any combination thereof. The measurement device 112 can be, for example, off-line, in-line, near-line, or otherwise positioned relative to the printing device 110. In addition to observing the printed output (such as for example, detecting optical density or color variations), other measurement devices 112 may observe printing device operation and components, such as for example, detecting missing nozzles within a print head or drive electronics (by, for example, detecting a high impedance or open circuit), detecting a change in the electrical response of the head or other components which may indicate, for example, air or a blockage in a nozzle, or the like or any combination thereof. In at least some embodiments, the measurement device 112 may be the printing device 110 as the printing device monitors its own operation or may be a device or software that is coupled to, or part of, the printing device to monitor the operation of the printing device.

Figure 1B:
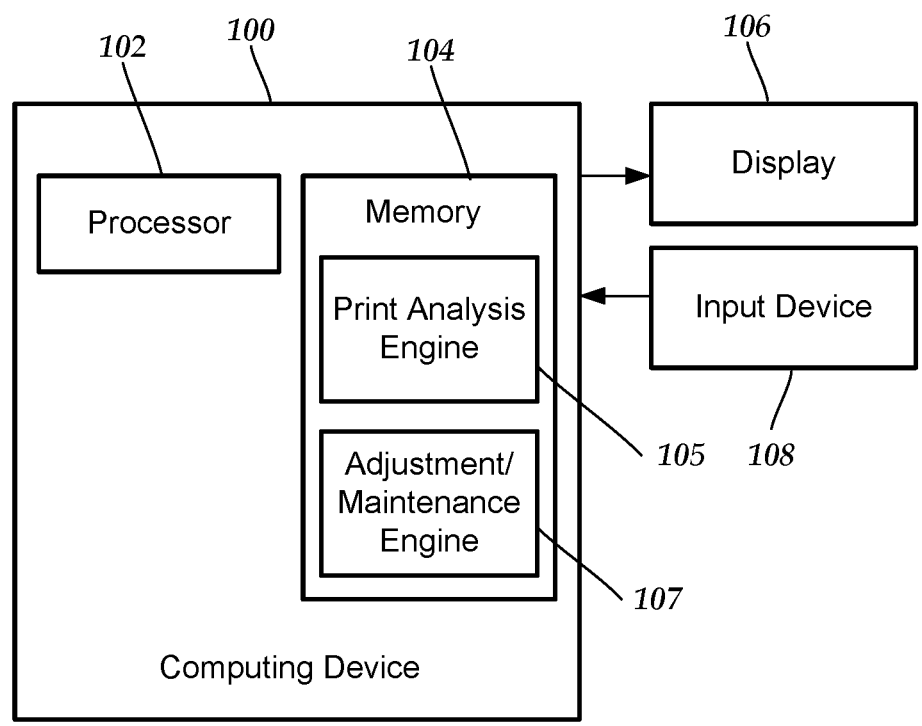
FIG. 1B is a schematic representation of one embodiment of a computing or printing device.

FIG. 1B illustrates one embodiment of a computing device 100 which can be used for analyzing print output to predict failures or maintenance needs and for making or suggesting adjustment, preemptive maintenance, or remediation based on the analysis. In at least some embodiments, the computing device 100 can be a printing device or part of a printing device or coupled wirelessly, through a local or non-local network, or by wire to a printing device. The computing device 100 includes a processor 102 and a memory 104 and can be attached to one or more of an optional display 106 or an optional input device 108.

The computing device 100 can be, for example, a laptop computer, desktop computer, printing press, printer, tablet, mobile device, smartphone or any other device that can run applications or programs, or any other suitable device for processing information. The computing device 100 can be entirely local to the user or can include components that are non-local to the user including one or both of the processor 102 or memory 104 (or portions thereof). For example, in some embodiments, the user may operate a terminal that is connected to a non-local computer. In some embodiments, the memory can be non-local to the user.

The computing device 100 can utilize any suitable processor 102 including one or more hardware processors that may be local to the user or non-local to the user or other components of the computing device. The processor 102 is configured to execute instructions provided to the processor.

Any suitable memory 104 can be used for the computing device 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The memory 104 includes instructions that can be executed in the processor 102. The memory may also include instructions that constitute a variety of different software engines. For example, the memory 104 can include a print analysis engine 105 and an adjustment/maintenance engine 107, which are described in more detail below. In at least some embodiments, any of these engines may be referred to as a module or logic.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Figure 2:
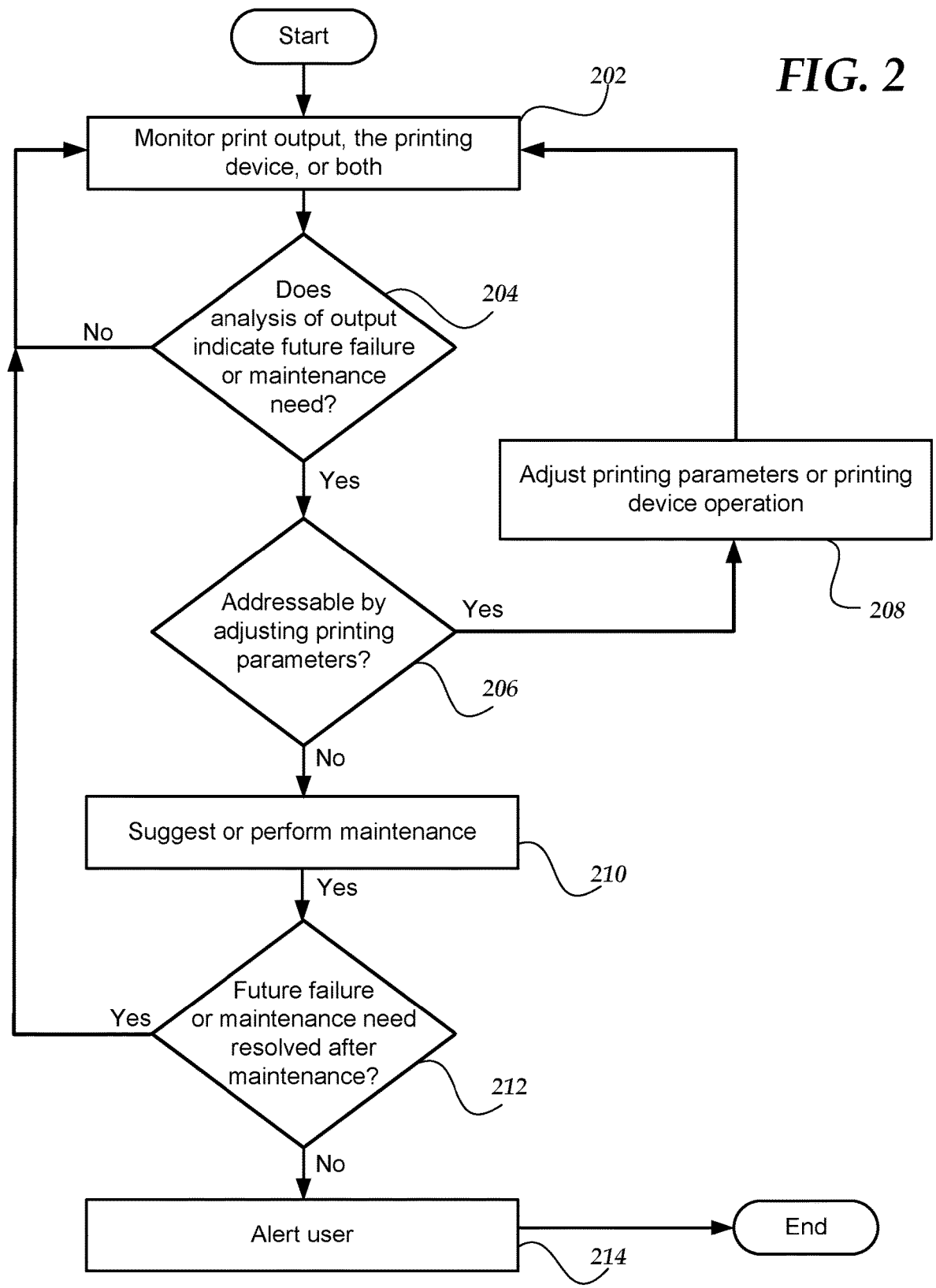
FIG. 2 is flowchart of one embodiment of a method of monitoring an inkjet printing device and predicting failures or maintenance needs.

FIG. 2 illustrates one embodiment of a method that can be implemented using the system presented in FIGS. 1A and 1B. In step 202, the print output from the printing device 110 or the printing device itself (or both) is monitored using the measurement device 112. For example, the print output can be monitored for print quality, for defects (for example, white lines in the print output, dark lines in the print output, uneven tonality or color, tonality or color varying with time, streaks, banding, mottle, optical density variations, geometric distortions, misalignment, dot size variation, uneven dot shape, satellite or aerosol drops, or the like or any combination thereof), for changes in printing which may be acceptable but indicate or predict future failure or maintenance need. As other examples, the printing device may be monitored for missing or degraded nozzles, changes in electrical response, printhead faceplate contamination, changes in alignment, ink system pressure variations, filter loading/blocking, drop volume variations, drop velocity variations, ink viscosity variations, or the like or any combination thereof. The system or method can utilize one or more measurement devices 112 to each monitor the print output or printing device for one or more of these issues.

As an example, the print output can be monitored to compensate for non-uniformity or for blocked nozzles by obtaining one or more measurements of the current behavior of the press and of individual heads and nozzles. In at least some embodiments, to compensate for a blocked nozzle, the system or user will want to know exactly which nozzle is blocked. This is the case even in situations where multiple print bars are used for the same colorant (for example, to increase the speed at which the press can run, to increase the resolution across the press, for redundancy, or for any other reason.)

Monitoring of the print output or printing device can include making measurements or other observations using at least one measurement device 112 and then analyzing the measurements or other observations. In at least some embodiments, measurements or other observations of the print output or printing device are accumulated over time. As part of the monitoring, these measurements or observations are analyzed. For example, the analysis may be directed to finding trends in changes in the printing device, such as changes in head behavior, or may be directed to identifying when the print output crosses one or more specified thresholds that indicate or predict future failures or maintenance needs, such as, for example, head problems, current or future head failure, nozzle drop outs, printhead faceplate wetting, misalignment, drop misdirection, drop volume or velocity changes, ink drying in nozzles, filter loading, or the like or any combination thereof.

In at least some embodiments, monitoring over time can be useful to, for example, establish whether the observations indicate a trend (e.g., moving in a specific direction) or noise (e.g., a random variation and not indicative of a trend). Trends can be used to determine a rate of change and thus when an acceptable performance threshold may be breached. As an example, the system can analyze the trend of observations or measurements made over time (for example, at regular or irregular intervals) to predict, based on those observations or measurements (and, optionally, based on a model or other algorithm that may include linear or non-linear extrapolation), future failure or maintenance need. For example, based on observations or measurements made over time, the system can predict future head problems, head failure, nozzle drop outs, printhead faceplate wetting, misalignment, drop misdirection, drop volume or velocity changes, ink drying in nozzles, filter loading, or the like or any combination thereof.

In at least some embodiments, the time period over which data is reviewed can be measured in minutes (for example, 5, 10, 15, or 30 minutes), hours (for example, 1, 2, 4, 8, or 12 hours), or days (for example, 1, 2, 5, 7, 10, 14, or 28 days) or can be a single print run, multiple print runs (for example, one, two, three, four, or more print runs), a single shift, or multiple shifts (for example, one, two, three, four, or more shifts.) In some embodiments, extended measurement or observation may be particularly useful to identify ephemeral effects or predict future failures or maintenance needs. Alternatively, or additionally, measurement or observations over a longer period, up to the lifetime of the press, can be reviewed or analyzed.

Examples of variables for which thresholds can be either preset or selected and which can indicate or predict future failures or maintenance needs include, but are not limited to, the level of variation in tonality or color for a particular ink or color; distribution of variation in tonality or color for a particular ink or color; number of missing nozzles; number of misdirected nozzles; change in tonality or color over time for a particular ink or color; number of white or light pixels, number of dark pixels, dot size or size distribution, number of satellites or aerosols, dot shape or roundness, line straightness, edge acuity, alignment accuracy, squareness, or the like or any combination thereof. In some embodiments, a threshold can be preset and, optionally, can be user-modified. In other embodiments, a threshold can be user selected or modified.

In step 204, the system determines whether the analysis of the output indicates or predicts a future failure or maintenance need for the heads or other components of the printing device. If no, the method and system return to step 202 to continue monitoring print output or the printing device or both.

If yes, then in step 206, the system determines whether the predicted failure or maintenance need can be addressed by adjusting printing parameters or printing device operation. For example, the predicted failure or maintenance need may be addressed by adjusting drop size, print density, the selection of print heads, the print head drive voltages or waveforms, printing speed, printhead alignment, the composition or viscosity of the ink, ink system pressures, ink recirculation rate, performing a PrintFlat™ optical density uniformity calibration or other calibration, adjusting UV pinning or curing, pre or post treatment parameters, or the like. If the future failure or maintenance need can be addressed by adjusting the printing parameters in step 208 with the new printing parameters provided to the printing device 110. In some embodiments, steps 206 and 208 are omitted.

If the predicted failure or maintenance need cannot be addressed by adjusting the printing parameters (or if steps 206 and 208 are omitted), in step 210 the system can perform maintenance or can suggest to a user (for example, an operator of the printing device) that maintenance be performed. Examples of possible suggestions or actions include, but are not limited to, cleaning of heads or other components, priming, purging, wiping, spitting, flushing, replacement of heads or print bars or other components, or reconfiguration of the printing device or ink, filter change or cleaning, ink replacement, or the like or any combination of these suggestions or actions.

Examples of maintenance include, but are not limited to the following: 1) When the tonality of prints from one or more heads or parts of heads has changed sufficiently (for example, meets or exceeds a threshold change) over time that the head is approaching the limits of what can be appropriately compensated for, the system may determine that the head should be cleaned or replaced. 2) When the number of missing or misdirected nozzles in a head or print bar has exceeded a threshold, the system may determine that the heads should be cleaned. 3) When the number of missing or misdirected nozzles in a head or print bar has exceeded a higher threshold, the system may determine that the head or print bar should be replaced. 4) When the tonality/color variations within a print run exceed a threshold (indicating, for example, that the nozzles are wetting or some other issue with similar effects), the system may indicate that the ink is poorly formulated for the press and conditions, has exceeded its use life or shelf life, or that the electrical waveform used to eject ink is wrong. 5) When the variation of tonality or distribution of variation of tonality exceeds a defined threshold then the system is recalibrated for tonality, such as by using the PrintFlat™ optical density uniformity calibration process or other calibration process. 6) When the dot size or size distribution, number of satellites or aerosols, dot shape or roundness exceeds a defined threshold then the print heads are purged and cleaned or replaced. 7) When the line straightness, edge acuity, alignment accuracy or squareness exceeds a defined threshold then the print heads are re-aligned.

In step 212, the system determines if the predicted failure or maintenance need was resolved after maintenance. If yes, the system returns to monitoring the print output. If no, the system alerts the user in step 214 to take further action. Alternatively, the system may return to step 210 to suggest or perform additional maintenance.

In at least some embodiments, by predicting failures or maintenance needs with print quality early, while the effects are still in a range that can be compensated for, facilitates the planning of maintenance, head replacement, or press reconfiguration. Scheduled down-time usually has less of an impact on production throughput and on profitability than unscheduled down-time forced by a machine failure. In at least some embodiments, the systems and methods can provide a larger proportion of the material printed by the printing device that is of acceptable quality.

It will be understood that each block of the flowchart illustration, and combinations of blocks in the flowchart illustration and methods disclosed herein, can be implemented by computer program instructions. These program instructions may be provided to a processor to produce a machine or engine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computing device. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

As an example, in at least some embodiments, steps 202 and 204 in FIG. 2 can be performed by the print analysis engine 105 of the computing device 100 of FIG. 1B. In at least some embodiments, steps 206 to 212 can be performed by the adjustment/maintenance engine 107 of the computing device 100 of FIG. 1B. Other arrangements of the software or hardware to perform the steps presented in FIG. 2 can also be used.

The above specification and examples provide a description of the invention. Since many embodiments of the invention can be made without departing from the spirit and scope of the invention, the invention also resides in the claims hereinafter appended.

What is claimed as new and desired to be protected by Letters Patent of the United States is:

1. A system for monitoring an inkjet printing device and predicting failures or maintenance needs, the system comprising:
   one or more memory devices that store instructions;
   a print analysis engine stored in the one or more memory devices, the print analysis engine configured to monitor print output from the inkjet printing device, operation of the inkjet printing device, or any combination thereof to predict failures or maintenance needs of the inkjet printing device; and
   one or more processor devices that execute the stored instructions to perform actions, including:
      monitoring the print output from the inkjet printing device, the operation of the inkjet printing device, or any combination thereof;
      based on the monitoring, predicting a failure or maintenance need of the inkjet printing device;
      based on the prediction, suggesting or performing maintenance on the inkjet printing device to address the predicted failure or maintenance need; and
      after maintenance has been performed, monitoring the print output, the operation of the printing device, or any combination thereof to determine whether the predicted failure or maintenance need has been resolved.

2. The system of claim 1, wherein the monitoring comprises receiving measurements of the print output or the operation of the inkjet printing device from a measurement device.

3. The system of claim 2, wherein the monitoring further comprises analyzing the measurements.

4. The system of claim 1, wherein the predicting comprises determining whether the print output or the operation of the inkjet printing device has met or exceeded a threshold selected to predict that the failure or maintenance need is likely to occur.

5. The system of claim 4, wherein the threshold is directed to a variation in tonality or color for an ink or color.

6. The system of claim 4, wherein the threshold is directed to a presence or number of inappropriate white lines in the print output.

7. The system of claim 4, wherein the threshold is directed to a number of blocked nozzles.

8. The system of claim 1, wherein the actions further include
   based on the prediction, adjusting printing parameters or printing device operation to compensate for the predicted failure or maintenance need.

9. The system of claim 1, further comprising the inkjet printing device.

10. The system of claim 9, wherein the one or more memory devices and the one or more processor devices are part of the inkjet printing device.

11. The system of claim 9, further comprising a computing device configured and arranged for communication with the inkjet printing device, wherein the one or more memory devices and the one or more processor devices are part of the computing device.

12. The system of claim 1, further comprising one or more measurement devices configured to generate the measurements.

13. The system of claim 12, further comprising the inkjet printing device, wherein at least one of the one or more measurement devices is part of the inkjet printing device.

14. The system of claim 12, wherein the one or more measurement devices comprises at least one first measurement device configured to produce measurements of the print output of the inkjet printing device.

15. A method for monitoring an inkjet printing device and predicting failures or maintenance needs, the method comprising:
   monitoring print output from the inkjet printing device, operation of the inkjet printing device, or any combination thereof;
   based on the monitoring, predicting a failure or maintenance need of the inkjet printing device;
   based on the prediction, suggesting or performing maintenance on the inkjet printing device to address the predicted failure or maintenance need; and
   after maintenance has been performed, monitoring the print output, the operation of the printing device, or any combination thereof to determine whether the predicted failure or maintenance need has been resolved.

16. The method of claim 15, wherein the monitoring comprises receiving measurements of the print output or the operation of the inkjet printing device from a measurement device.

17. The method of claim 16, wherein the monitoring further comprises analyzing the measurements.

18. The method of claim 15, wherein the predicting comprises determining whether the print output or the operation of the inkjet printing device has met or exceeded a threshold selected to predict that the failure or maintenance need is likely to occur.

19. The method of claim 15, further comprising
   based on the prediction, adjusting printing parameters or printing device operation to compensate for the predicted failure or maintenance need.

20. The method of claim 15, wherein predicting the failure or maintenance need comprises predicting the failure or maintenance needs based on identification of a trend in the print output of the printing device.

* * * * *